(12) United States Patent
Balayoghan et al.

(10) Patent No.: US 7,860,989 B2
(45) Date of Patent: Dec. 28, 2010

(54) EFFICIENT TRANSFORMATION OF INTERCHANGE FORMAT MESSAGES

(75) Inventors: Vaithialingam B. Balayoghan, Bellevue, WA (US); Douglas A. Walter, Issaquah, WA (US); Giovanni Della-Libera, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1397 days.

(21) Appl. No.: 11/049,157

(22) Filed: Feb. 2, 2005

(65) Prior Publication Data

US 2006/0173899 A1 Aug. 3, 2006

(51) Int. Cl.
G06F 15/16 (2006.01)

(52) U.S. Cl. ...................................... 709/230; 707/602

(58) Field of Classification Search ................. 709/230; 707/602
See application file for complete search history.

(56) References Cited

U.S. PATENT DOCUMENTS

| | | | | |
|---|---|---|---|---|
| 2002/0049789 A1* | 4/2002 | Frolich et al. | ............... | 707/513 |
| 2002/0111963 A1* | 8/2002 | Gebert et al. | ............... | 707/513 |
| 2003/0046370 A1 | 3/2003 | Courtney | ..................... | 709/220 |
| 2004/0034830 A1* | 2/2004 | Fuchs et al. | ............... | 715/501.1 |
| 2004/0131082 A1* | 7/2004 | Evans et al. | .................. | 370/469 |
| 2004/0168124 A1 | 8/2004 | Beisiegel et al. | ............ | 715/513 |
| 2004/0205520 A1* | 10/2004 | Adams et al. | ............... | 715/503 |
| 2006/0041838 A1* | 2/2006 | Khan | ......................... | 715/513 |
| 2006/0167909 A1* | 7/2006 | Mendis et al. | .............. | 707/101 |

FOREIGN PATENT DOCUMENTS

EP 1 241 589 9/2002

* cited by examiner

*Primary Examiner*—Thu Nguyen
*Assistant Examiner*—Thomas J Dailey
(74) *Attorney, Agent, or Firm*—Workman Nydegger

(57) ABSTRACT

In a computerized system, a sending computer system and recipient computer system exchange an interchange format message in a resource-efficient manner. For example, a transformation writer at the sending computer system selects and transforms only one or few of a plurality of units of the message at the time. The transformed message units are then streamed to the recipient computer system in accordance with a relevant transformation standard, such as the canonicalization standard in the case of XML messages. A transformation reader at the recipient computer system transforms the messages using a buffer big enough for received message units, and passes the transformed units to a file. Thus, the transformation writer acts as a stream writer to pass a message, and the transformation reader acts as a stream reader at the recipient computer system.

19 Claims, 3 Drawing Sheets

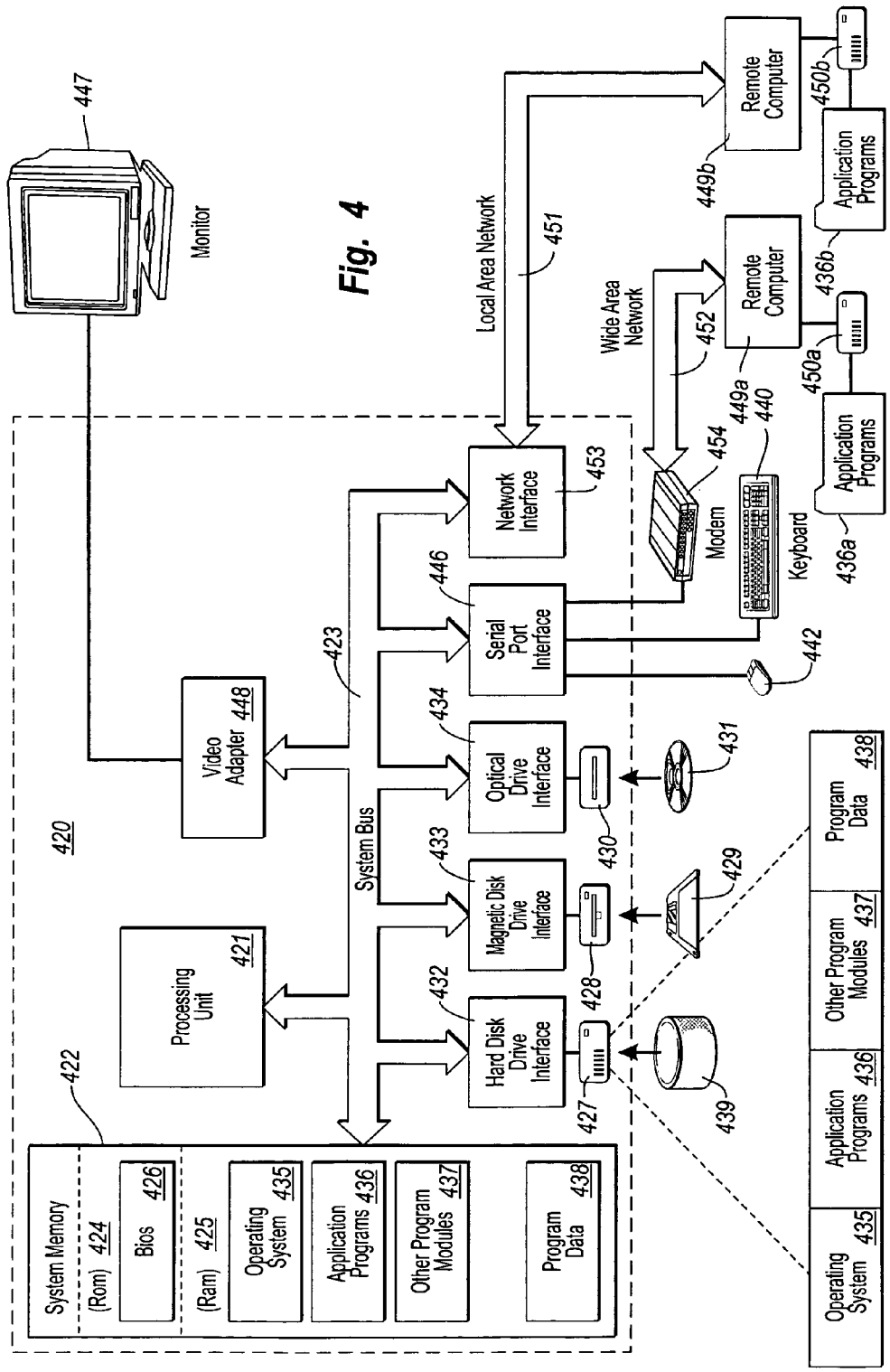

EFFICIENT TRANSFORMATION OF INTERCHANGE FORMAT MESSAGES

BACKGROUND OF THE INVENTION

1. The Field of the Invention

This invention relates to systems, methods, and computer program products for transforming interchange file format messages, such as XML messages, in an efficient manner between a sender and a receiver.

2. Background and Relevant Art

Interchange file formats, such as XML are becoming increasingly popular due in part to the options they afford for data viewing or presentation across a variety of computing platforms. There are several different types of interchange format files, some of which are geared toward picture data, others for sound, and still others for general text. In any event, interchange data formats are commonly used for a wide range of data exchanges, ranging from low complexity instant messaging exchanges to high complexity, secure electronic commerce exchanges.

In general, an interchange data format comprises a series of elements and codes, a such as namespace codes in XML, that can be read by virtually any computing platform with an appropriate reader. For example, a file represented in an interchange format may include one or more elements that indicate that the file is an interchange format file as well as an identifier that indicates what type of file the message is (i.e., text, audio, video, etc.) The type of interchange format may also specify certain codes in the file that indicate a number of visible and hidden properties associated with the given message. For example, visible properties associated with the document might include information about how certain types of text should be viewed, such as may relate to color, font size, arrangement, and so forth. Hidden properties, on the other hand, might indicate the entity that created the document, that entity that is intended to view the document, security information, and so forth.

For a document to be sent, received and viewed as intended between a sender and receiver, the sender will usually transform the entire message appropriate for the relevant interchange format. On the receiving end, the receiver will then read the file upon receipt, assuming the receiver is capable of reading the specific interchange format. One type of transformation method often used with interchange formats such as XML is called "canonicalization", transforming the message or message unit to reduce it to a standard form so as to eliminate or minimize insignificant differences. For example, in the case of XML message units, canonicalization rules include specific rules on namespace selection for rendering, linefeed normalization, character translation, scope of internal commands, and so forth.

Unfortunately, some communication modes are more sensitive to inadvertent intermediary changes than others, and can result in an intended recipient failing to view the message appropriately, or receiving the message in the first instance. For example, in high security implementations, data that is transformed with a small amount of variability or mismatch at one end may not be viewed or received appropriately by the intended recipient, or even transformed in the first instance. Similarly, high security data that may be transformed appropriately at the sending end may still not be received appropriately at the receiving end due to altering of the data during transit, which can occur in allowed ways.

Accordingly, accurate and consistent transformation methods are increasingly important for interchange format data transfers, particularly in sensitive areas such as secure communications. Unfortunately, due at least in part to the care required to transform a message appropriately, transformation methods can constitute an expensive aspect of a computerized system's processing.

For example, when a message is intended to be transformed before being sent, a buffer is created proportional in size to the entire message size. A representation of the entire message is then loaded into the buffer, and a reader and writer are created for the message representation. In the case of XML messages, the message representation may also be loaded into a Document Object Model ("DOM") component, which reads each element of the message into the buffer, and subsequently writes out the message as a single transformed output. In any event, a transformed output is then sent to the recipient.

At least one problem with this approach is the need to create a buffer large enough to read the entire message, and a buffer large enough to receive the entire transformed message. In some cases, one or more buffers will also be allocated both for the entire transformed and non-transformed version of the message before it is sent to the recipient, or at the recipient computer system after being received. Especially for larger messages that may be in the gigabyte size range, such buffer allocation can be taxing on the processing and memory resources of a computerized system handling a large number of requests. These and other similar problems can be exacerbated in some cases since the sending computer system will implement both read and write functionality for the sending process, even though the sending computer system typically reads at a much slower rate than it can write.

A reverse process, having similar complications, occurs at the recipient end. In particular, the recipient computer system generally needs to allocate a buffer large enough for the entire message, even though the recipient computer system is receiving only small chunks of the message from the sender at a time. In some cases, the recipient computer system may also allocate duplicate buffer space so that there is a buffer for transformed and non-transformed versions of the entire, received message. Furthermore, the recipient computer system has to expend additional resources loading the transformed message into a buffer, as well as reading and writing out the elements of the message. Having a similar but reverse problem compared to the sending computer systems, the recipient computer system typically writes much slower than it reads. As such, the allocation of several large buffers, and the creation of both read and write process functionality for both sending and receiving computer systems represents fairly taxing on processing and memory resources.

Accordingly, an advantage in the art can be realized with systems, methods, and computer program products that provide efficient transformations of interchange format data at both a sending and receiving end. In particular, methods of transforming data without loading each entire message into memory would be an advantage in the art. Furthermore, methods of transforming data which take advantage of the relative strengths of the sending computer system or the receiving computer system would be an advantage in the art.

BRIEF SUMMARY OF THE INVENTION

The present invention solves one or more of the foregoing problems in the prior art with systems, methods, and computer program products configured for efficiently transforming interchange format messages. In particular, implementations of the present invention relate in one aspect to transforming interchange message units (e.g., canonicalized message units) into discrete components of a data stream, rather than loading the entire message into an allocated buffer before transforming and sending an entire message.

For example, a method from a sending computer perspective for transforming a message in accordance with one implementation of the present invention comprises accessing an interchange format message that includes a plurality of different message units. In one implementation, a transformation writer at the sending computer system selects an initial set of one or more message units from the message, and transforms the initial set based on a transformation standard. The transformation writer then selects a subsequent different set of one or more units of the message, and transforms the subsequent set based on the standard. As the units are selected and processed, the transformed message units (and corresponding digests, where appropriate) also passes the transformed sets of units to output. As such, the interchange message is transformed in only one or a few units at a time, which can result in significant savings at least with buffer allocation and other system resources. Furthermore the sending computer system is configured primarily to write interchange format data, which plays to the functional advantages of the sending computer system.

A method from the recipient computer perspective of transforming received, transformed message units comprises receiving an initial set of one or more transformed units of a message into memory. The initial set of units represent fewer than all the units in the message, and so the allocated memory only needs to be large enough to receive the initial set of units, rather than the entire message, or entire message and accompanying digest where applicable. The recipient computer system then transforms the received transformed initial set of units based on the applicable transformation standard, and passes the corresponding initial portion of the interchange format message to a file. The recipient computer system then receives a subsequent set of one or more transformed units of the interchange format message into memory, transforms the subsequent set, and passes them to the file. Accordingly, the recipient computer system is configured primarily to read interchange format data, which plays to the functional advantages of the recipient computer system.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates a block diagram of an exemplary computing environment that is suitable for use in accordance with the present invention.

DETAILED DESCRIPTION OF THE PREFERRED EMBODIMENTS

The present invention extends to systems, methods, and computer program products configured for efficiently transforming interchange format messages. In particular, implementations of the present invention relate in one aspect to transforming interchange message units (e.g., canonicalized message units) into discrete components of a data stream, rather than loading the entire message into an allocated buffer.

As will be understood from the present specification and claims, one aspect of the invention includes transforming only bits of a message at a time into a stream, such as one or more units of the message into corresponding streams. In general, only a relatively smaller buffer for the various transformation components may need to be allocated by the transformation writer, which is independent of the entire message size when digesting is combined with the transformation process, and can therefore be reused for each selected unit of the message. Each message unit is then simply transformed and passed directly to output, such as to a stream accumulator.

In another aspect of the invention, the transformed message units are sent to a recipient just after the units are transformed, and, in some cases, just after the units are transformed, digested, and signed. In still other aspects of the invention, the transformed units can still be accumulated into another buffer before being sent to the recipient, if the recipient is not configured to receive the streamed message units. Accordingly, there are a variety of ways in which the messages can be selected, and transformed, and sent to a recipient without necessarily having to create large, buffers for large messages.

At the receive side, a recipient computer system receives transformed units received as a stream, and processes the transformed units accordingly. In one aspect of the invention, the recipient computer system can use a buffer for each individual unit, which may be the same or different buffers, but is nevertheless smaller than the size required to hold all of the units in the message. In another aspect of the invention, the recipient computer system reads the transformed units directly to a normalization component, and then passes them to an application or file, such as a file in storage. In still another aspect of the invention, the recipient computer system digests transformed units that were digested at the sending computer system, and compares the respective digests.

Figure 1:
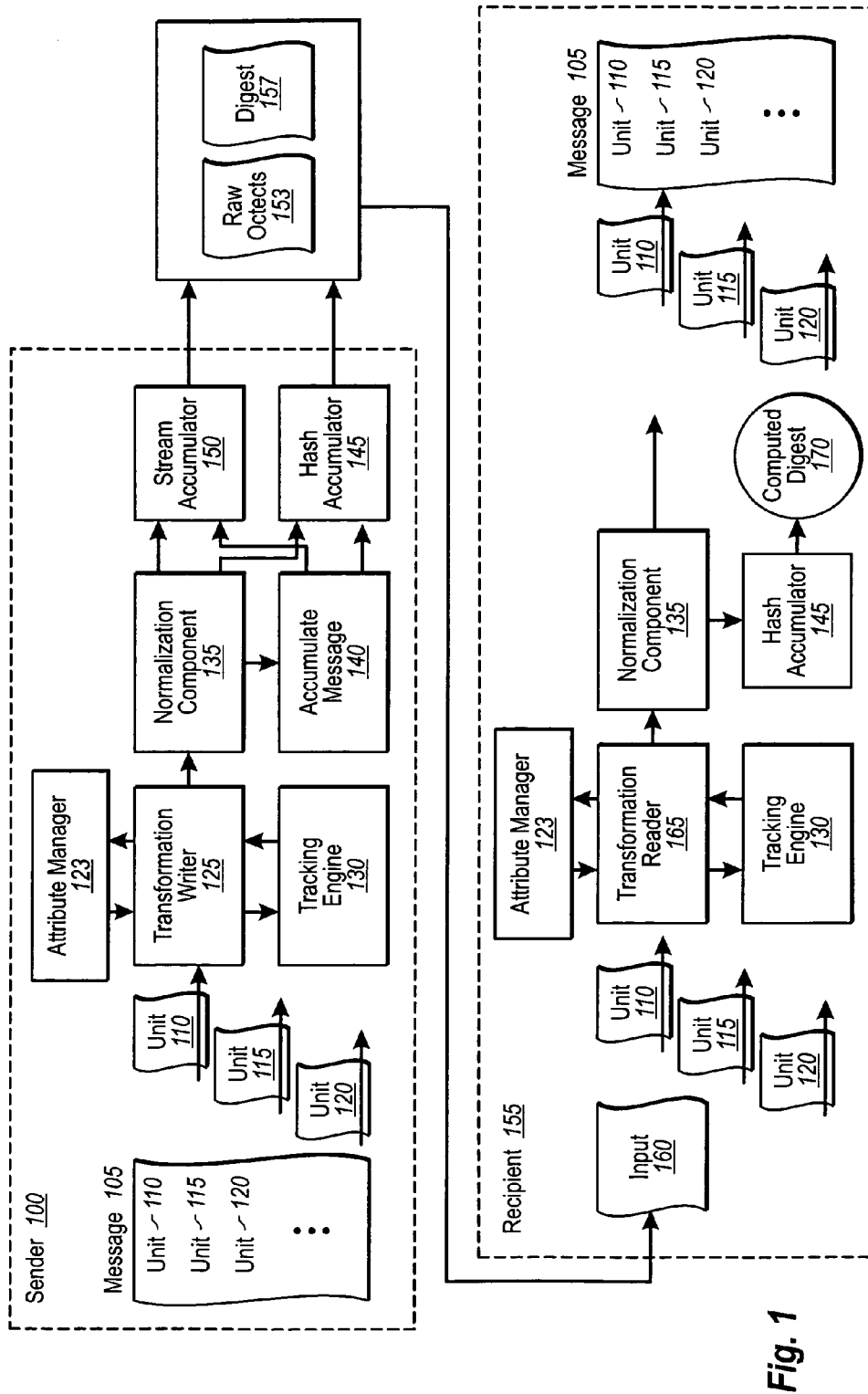
FIG. 1 illustrates an overview block diagram for sending and receiving an interchange format message that is transformed in accordance with an implementation of the present invention.

For example, FIG. 1 illustrates an overview block diagram in which an interchange format message 105, which has one or more units 110, 115, and 120, is transformed and sent from a sending computer system 100 to a recipient computer system 155. In general, message 105 will be of any interchange format, such as an XML, HTML, GIF, WAV, or other type of interchange format, although frequent reference is made herein to XML messages. In at least one implementation, the units (110, 115, 120) of the message 105 will be understood generally to mean nested elements, such as nested elements in an XML, or HTML document. Units such as these typically each also comprise one or more namespaces, which, in for example XML, refer to a collection of names identified by a URI reference, as element types and attribute names. Nevertheless, "namespaces" in XML may sometimes have a unique meaning compared with other interchange formats. As such, it will be understood that similar data structures in other file formats can be given similar treatment as described herein.

When the sender 100 sends a message 105 to the recipient 155 in accordance with the present invention, a transformation writer 125 at the sender 100 side selects only one or a few message units (i.e., an initial or subsequent set of units) at a time. In general, a transformation writer 125 will be understood as a set of computer-executable instructions, such as a program class associated with an application. As shown in FIG. 1, for example, the transformation writer 125 accesses the message 105, and selects message unit 110, then message unit 115, and then message unit 120, etc. in successive intervals.

In at least one implementation, the transformation writer 125 allocates a memory buffer of independent size compared to the entire message 105 size, but is nevertheless sufficient in size for a predetermined amount of message selection. For example, if the transformation writer 125 decides that it is appropriate to select 100 bytes at a time of an accessed message, the buffer only needs to be approximately 100 bytes, or slightly larger. The allocated buffer can then be reused for each selected message unit, which will be approximately 100 bytes or at least within the parameter size of the allocated buffer, and thus fit into the allocated buffer. The size of the selection, in turn, can be based on any number of factors, such as resources available for processing, connection bandwidth, and so forth. Thus, the transformation writer 125 can efficiently use memory and processing resources appropriate at a given point in time, without Oz necessarily having to adjust processing and memory resources for each message that needs to be transformed and sent.

After selecting the given unit, e.g., unit 110, the transformation writer 125 interacts with an attribute manager 123, which identifies and manages XML attributes in the message. The transformation writer 125 can also interact with a tracking engine 130, which administrates the namespaces (not shown) for each of the given units without use of a Document Object Model ("DOM") in the case of XML messages. In general, each unit 110, 115, 120, will have one or more namespaces that are ultimately represented in the stream accumulator 150. Not all of the namespaces from the given unit, however, are needed immediately, or will need to be rendered since identical namespaces from a prior unit may already have been rendered. Accordingly, the tracking engine 130 is configured to identify namespaces that are to be rendered, and/or, in an appropriate transformation protocol, namespaces that are to be unrendered, but available.

By way of explanation, whether a namespace is to be rendered depends on the transformation protocol. For example, XML canonicalization typically includes two versions: "exclusive", and "inclusive". With "exclusive canonicalization", a namespace is rendered only if it is immediately utilized and not already rendered in a visible ancestral context. This can be further refined with an "inclusive prefixes list", which says that, even if a namespace is not immediately used, the namespace should be rendered only if it has not already been rendered.

In any event, the selected unit (e.g., unit 110) is then passed to the normalization component 135, which transforms the unit based on a transformation standard. For example, when using canonicalization as the transformation standard, the normalization component 135 might transform the unit 110 according to the c14n canonicalization standard. In general, transformation standards dictate how data, such as strings and characters in a text file, are to be sent out in a universally-readable format, which can be read by any operating system intended to read the specific interchange format. For example, the canonicalization standard might state that a string, such as "foo", will be passed along as is, while a character such as "<", may be represented in the output as "<".

With secure interchange messages, the transformation writer 125 can perform additional steps along with selecting the one or more units and transforming the one or more units to ensure that each of the selected units are sent and received as intended, and done so efficiently. For example, if the message 105 is a secure message, it will have an identifier in one or more portions or units in the message, such as at the message header, but not necessarily in each of the other remaining units. Ordinarily, having the identifier in only few portions of the message 105 would be sufficient using conventional transformation protocols.

Nevertheless, since the present implementations involve passing each unit individually to the recipient, the transformation writer 125 may need to ensure that all units of a secure message need to be digitally signed, and so should each have an identifier associated therewith. Accordingly, the transformation writer 125 can also scan the individual unit of a secure message, such as the unit that represents a message header, to find whether the unit has an identifier. If the unit is part of a secure message, but does not include an associated identifier, the transformation writer 125 can insert an identifier into the unit. In at least one implementation, the transformation writer 125 performs the steps of scanning for an identifier, inserting the identifier, and as transforming the unit in a single pass of the unit.

The transformed message units are then sent directly to stream accumulator 150, such as directly to a streaming socket that was initiated with a connection with the recipient computer system 155. In other cases, particularly with secure messages, the transformed units are passed to a hash accumulator 145, which creates a corresponding digest 157 for each unit for error checking purposes, and then passes output as raw octets 153 and corresponding digests 157 in pairs. In other cases, such as if the recipient 155 is not configured to receive a stream of individual message units, the message may also be buffered in an "Accumulate Message" component 140.

In such a situation, the present implementation can still realize efficiency gains since a similarly sized buffer did not also have to be created in the first instance when the transformation writer 125 initially selected the message 105. The accumulated message can then be passed directly to the stream accumulator 150, or to the hash accumulator 145 and then to stream accumulator 150 paired with a digest. However sent to output, the resulting raw octets 153 are then streamed to input 160 at the recipient computer system 155. In one implementation, the data stream comprises successive 20 byte chunks of data.

Referring now to the recipient computer system 155, the inverse order of functions is performed when reading a stream of data into a corresponding representation of message 105 through a transformation reader 165. The transformation reader 165, as with the transformation writer 125, is a set of computer-executable instructions, such as a program class that is associated with an application program. When the recipient computer system 155 receives the transformed units or set of units (e.g., transformed unit 110), the transformation reader 165 at the recipient computer system allocates a buffer (not shown), which will ordinarily be sufficient in size for each transformed unit that is received, but not large enough for the entire message 105. As such, the recipient computer system 155 can simply reuse the allocated buffer, and therefore does not necessarily need to create a new buffer for each additional incoming message unit. In one implementation, particularly for large messages, this can represent a significant memory space and processing savings.

The transformation reader 165 at the recipient computer system 155 also passes the received, transformed units through one or more appropriate components or modules for processing. For example, if the recipient computer system 155 receives generic transformed units, such as those that have not been are associated with a digest, the transformation reader 165 passes the transformed units from input 160 as they are received to the normalization component 135. Alternatively, such as in the case of XML messages, if a digest is included with the received, transformed units, the normalization component 135 at the recipient computer system 155 passes the received data to a hash accumulator 145 at the recipient computer system 155, which computes another digest 170 on the transformed units. The digest 157 received from the sending computer system 100 is then compared with the computed digest 170. If the two digests match, then the normalization component 135 of the recipient computer system 155 transforms the transformed unit based on the canonicalization standard, and the unit is passed to the corresponding file.

In the case of XML messages, the transformation reader 165 can also manage attributes of the incoming message units through an attribute manager 123. The transformation reader 165 can further perform a similar tracking function of the namespaces with the tracking engine 130 at the recipient computer system, and compare the namespaces of each unit to see whether the namespace is to be rendered, or is to be unrendered, but available. The units are then read and passed individually to the corresponding accumulation file, which will ultimately represent the message 105. In one instance, the recipient computer system 155 creates the accumulation file in system memory, the file being a memory buffer that is large enough to accumulate the plurality of units (e.g., units 110, 115, and 120, etc.) after they are received and transformed to their original representations. In other cases, however, the accumulation file is located in hard drive storage, such that no additional system memory buffer ever needs to be created for the incoming message units as they are received and transformed.

Figure 2:
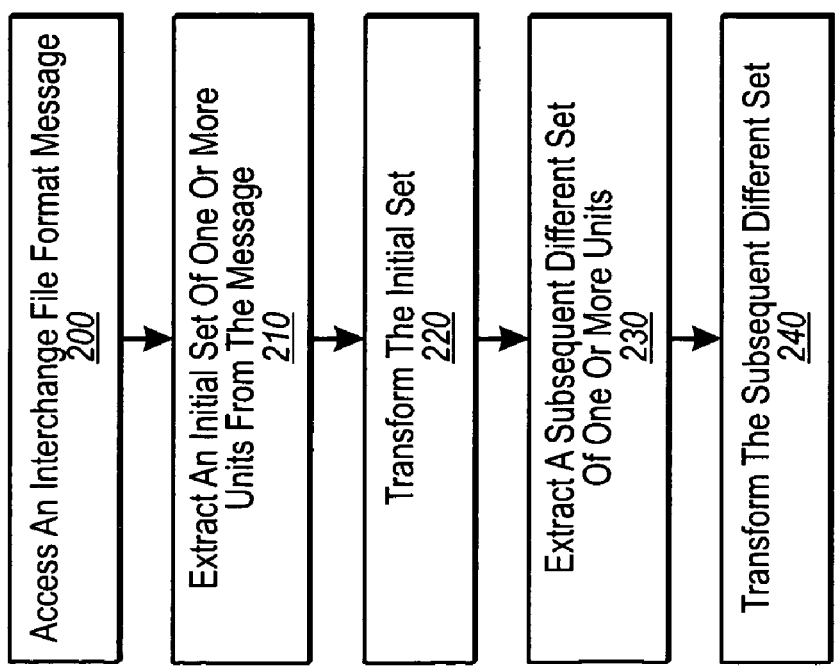
FIG. 2 illustrates a method of sending an interchange format message that is transformed in accordance with an implementation of the present invention.

FIG. 2 illustrates a series of acts in a method of transforming a message in a resource-efficient manner from the sending computer system perspective. The acts of FIG. 2 will are discussed below with reference to FIG. 1. For example, FIG. 2 shows that a method in accordance with an implementation of the present invention includes an act 200 of selecting an interchange format message. Act 200 includes selecting an interchange format message, the interchange format message including a plurality of different message units. For example, an XML message 105 may contain a plurality of units 110, 115, and 120.

The method further comprises an act 210 of selecting an initial set of one or more units from the message. Act 210 includes selecting an initial set of one or more units from the message into memory, such that fewer than all of the plurality of different message units are selected. For example, a transformation writer 125 can select unit 110 and/or unit 115, etc., but not all of the units available in the message, and place the unit(s) into an allocated memory portion of a size that is independent of the message 105 size. In other implementations, such as with secure implementations, the transformation writer 125 also scans the unit 110 for an identifier, and inserts the identifier in the unit 110 if one is required. Accordingly, the transformation writer 125 can reduce demands on the computerized system by only utilizing a much smaller memory space than would otherwise be needed when extracting the message, particularly when needing to transform very large messages that are to be sent to a recipient computer system.

In addition, the method of FIG. 2 comprises an act 220 of transforming the initial set. Act 200 includes transforming the one or more units of the initial set into a transformed initial set of one or more transformed units based on a standard. For example, in the case of an XML message 105, rendered or previously rendered namespaces of each unit in the set are passed to a normalization component 135, which canonicalizes each unit of the initial set into a canonicalized unit that can be passed to stream accumulator 150. The canonicalized unit can also be passed to a hash accumulator 145 before being passed to stream accumulator 150, and can also be passed to an accumulate message 140 component before being passes to the hash accumulator 145 or directly to stream accumulator 150, as the recipient may require.

Furthermore, the method of FIG. 2 comprises an act 230 of selecting a subsequent different set of one or more units. Act 230 includes selecting a subsequent different set of one or more units from the message into memory, such that fewer than all of the plurality of different message units are selected. For example, after selecting (or selecting and transforming) unit 110 and/or unit 115, the transformation writer 125 can select a subsequent different message unit 120, which is, of course, less than all of the plurality of units (i.e., 110, 115, 120, etc.) in the message 105.

The subsequent different message unit 120 is then passed through a similar set of acts. In particular, the method of FIG. 2 also comprises an act 240 of transforming the subsequent different set. Act 240 includes transforming the one or more units of the different subsequent set into a transformed subsequent set of one or more transformed units. For example, in the case of an XML message 105, the rendered or previously rendered namespaces of the unit(s) 120 in the subsequent set are passed to a normalization component 135, which canonicalizes the one or more namespaces of the unit(s) 120 of the subsequent set based on the canonicalization standard. The transformed subsequent set of units are then passed directly to stream accumulator 150, or to a hash accumulator 145 then to stream accumulator 150, or to an accumulate message 140 component, then on to the hash accumulator 145 and/or to stream accumulator 150. In some cases, this also involves processing and passing the subsequent set of units to the previously allocated memory that was used with the initial set of selected one or more units. Accordingly, FIG. 2 illustrates that the components, such as the transformation writer 125, of the sending computer system 100 behave primarily as a stream writer, and do not have to necessarily spend resources also reading each of the elements of a given message 105

Figure 3:
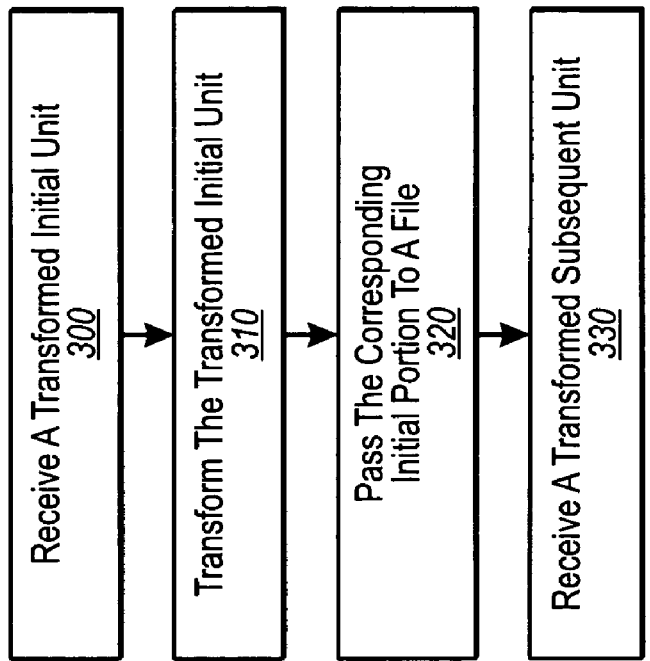
FIG. 3 illustrates a method of receiving a transformed interchange format message in accordance with an implementation of the present invention.

FIG. 3 illustrates a method that comprises a series of acts on the recipient side of the method in FIG. 2. The acts of FIG. 3 are discussed below with respect to the components and modules of FIG. 1. In particular, a method of transforming a received interchange format message in a resource-efficient manner comprises an act 300 of receiving a transformed initial unit. Act 300 includes receiving at least one transformed initial unit of an interchange format message into memory, the at least one transformed initial unit representing fewer than all of a plurality of transformed units in the message.

For example, a recipient computer system 155 can receive one or more a transformed units 110, 115 of a message 105, which nevertheless represent fewer than all of the plurality of transformed units (e.g., 110, 115, 120, etc.) of the whole message 105. Thus, the transformation reader 165 will allocate only enough memory for the size of the initial set of received units, but not all units of the plurality. For example, if the transformed initial unit is about 20 bytes in size, the transformation reader 165 will allocate about 20 bytes or more of memory to accommodate the transformed initial unit.

The method of FIG. 3 also comprises an act 310 of transforming the initial unit. Act 310 includes transforming the transformed initial unit into a corresponding initial portion of the interchange format message based on a standard. For example, in the case of an XML message, a transformed unit 110 received as an octet at an input component 160 can be passed to a normalization component 135, and on to a hash accumulator 145 or only to the normalization component 135 in the event of no accompanying digest 157. When a digest 157 is received with the raw octets 153, the hash accumulator 145 may be used to generate a computed digest 170 of the received unit for error checking purposes, such as by comparing the computed digest 170 with the received digest 157. The normalization component 135 can then transform the canonicalized unit 110 based on the c14n canonicalization standard into a portion of the XML message 105. For example, the string "foo" of a given element might be passed along as is, while the characters "<" might be transformed to the character "<".

The method of FIG. 3 also comprises an act 320 of passing the corresponding initial portion to a file. Act 320 includes passing the corresponding initial portion of the interchange format message to a file. For example, after the unit 110 has been passed through the normalization component 135, the transformation reader 165 reads and passes the unit 110 into a file, or to an application. To conserve system memory resources, the file can be a buffer allocated in storage, rather than in system memory. At this point, having received only one (or fewer than all) of the plurality of transformed units of the message 105 from the sending computer system 100, the file (e.g., message 105 at the recipient computer system 155) to which the unit 110 is sent by the transformation reader 165 is incomplete.

Accordingly, the method of FIG. 3 also comprises an act 330 of receiving a transformed subsequent unit. Act 330 includes receiving at least one transformed subsequent unit of the interchange format message into memory, the at least one transformed subsequent unit representing fewer than all of the plurality of transformed units in the message. For example, after receiving the unit 110 as an initial octet at the input 160, the recipient computer system 155 can further receive a subsequent octet, which includes transformed units 115 and/or 120, etc. Since the subsequent octet represents fewer units than present in all of the original message 105 at the sending computer system, the recipient computer system 155 can place the subsequent octet in a relatively smaller memory portion. Ultimately, when the file includes all of the original units from the sender 100, the file will be equal to message 105 at the recipient computer system 155, which is substantially representative of message 105 at the sending computer system 100.

One will appreciate that the foregoing diagrams and methods can be altered in any number of ways consistent with the principles of the present invention. For example, the interchange message 105 can be any number of interchange formats beyond XML, HTML, and so forth, and the standards for transforming the relevant files can be those other than canonicalization. Furthermore, the foregoing methods and diagrams can be further modified to accommodate varying degrees of simplicity or complexity in a message as may relate to secure messages, and so forth, so long as the transformation writer 125 behaves primarily as a stream writer, and the transformation reader 165 behaves primarily as a stream reader.

Thus, the sending computer system and the receiving computer system can accomplish significant efficiency gains by significantly reducing memory allocation requirements, by taking advantage of relative write or read speed strengths, and by accomplishing many of the conventional transformation methods in a single routine. Accordingly, the present specification and claims provide novel methods, systems, and apparatus for passing interchange format messages, such as XML, HTML, and the like from a sending system to a receiving system, without overburdening computing resources.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing the invention includes a general-purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disc drive 428 for reading from or writing to a removable magnetic disk 429, and an optical disc drive 430 for reading from or writing to removable optical disc 431 such as a CD ROM or other optical media. The magnetic hard disk drive 427, magnetic disk drive 428, and optical disc drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disc 431, other types of computer readable media for storing data can be used, including magnetic cassettes, flash memory cards, digital versatile disks, Bernoulli cartridges, RAMs, ROMs, and the like. Computer readable media however should not be construed as including signals.

Program code means comprising one or more program modules may be stored on the hard disk 439, magnetic disk 429, optical disc 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. At a sending computer system in a computerized environment where the sending computer system and a receiving computer system can exchange one or more messages in an interchange format, a method of canonicalizing and digesting an interchange format message in a resource-efficient manner, comprising the acts of:

accessing an interchange format message, the interchange format message including a plurality of different message units;

selecting an initial set of one or more message units from the message to be canonicalized and digested during a first transforming process, such that fewer than all of the plurality of different message units from the interchange format message are selected to be canonicalized and digested during the first transforming process;

allocating a portion of system memory sufficient to receive the initial set of one or more message units, wherein the portion of system memory is insufficient in size to store all of the plurality of different message units belonging to the interchange format message at a same time;

placing the initial set of one or more message units into the allocated portion of system memory;

canonicalizing each of the one or more message units of the initial set, contained within the allocated portion of system memory;

prior to canonicalizing a subsequent different set of one or more message units from the interchange format message, assigning an identifier and a digest to each of the one or more message units of the initial set such that canonicalization and digesting of the one or more message units of the initial set are performed in a single pass;

selecting a subsequent different set of one or more message units from the interchange format message to be canonicalized and digested during a second transforming process, such that fewer than all of the plurality of different message units of the interchange format message are selected for the subsequent different set; and overwriting the allocated portion of memory that stored the initial set of one or more message units with the subsequent different set of one or more message units of the same interchange format message;

canonicalizing each of the one or more message units of the subsequent different set contained within the allocated portion of system memory;

assigning an identifier and a digest to each of the one or more message units of the subsequent different set; and sending each of the plurality of message units of the interchange format message with its corresponding digest to the receiving computer system.

2. The method as recited in claim 1, wherein each of the one or more message units of the initial and subsequent sets are canonicalized using a transformation writer.

3. The method as recited in claim 1, wherein the one or more message units of the initial set are sent to the receiving computer system upon being assigned a digest without being accumulated in a buffer to wait for the remaining message units of the subsequent different set to be canonicalized and digested.

4. The method as recited in claim 1, wherein the interchange format message is an XML message.

5. The method as recited in claim 4, wherein the message units are canonicalized using the c14n standard.

6. The method as recited in claim 1, further comprising allocating a portion of system memory sufficient to receive more than at least the initial set of one or more units in the message, but not all of the plurality of units in the message.

7. The method as recited in claim 6, wherein the size of each message units is based on a connection bandwidth.

8. The method as recited in claim 6, wherein the size of each message unit is based on presently available processing resources or system memory resources.

9. The method as recited in claim 1, wherein assigning an identifier to each of the one or more message units of the initial or subsequent set further comprises:
   scanning the one or more message units of the initial or subsequent set for an identifier; and
   inserting an identifier in any of the one or more message units of the initial or subsequent set if an identifier is required for the unit but not found.

10. The method as recited in claim 9, wherein at least one of the one or more message units of the initial set is a message header of an XML message.

11. The method as recited in claim 9, further comprising the acts of:
   digitally signing each of the one or more message units of the initial set, independent of each of the one or more message units of the subsequent set.

12. The method as recited in claim 1, further comprising the acts of:
   identifying that an intended recipient of the accessed message requires a stream of the entire message;
   accumulating each of the plurality of message units as they are canonicalized and digested; and
   streaming the accumulated message units.

13. The method as recited in claim 1, wherein the act of selecting the initial set of one or more message units and canonicalizing the initial set of one or more message units is performed by a transformation writer, wherein the transformation writer is a program class that is associated with an application.

14. The method as recited in claim 1, further comprising:
   receiving, at the receiving computer system, the initial set of one or more message units of the interchange format message into an allocated portion of memory;
   transforming the received initial set of message units into a corresponding initial portion of the interchange format message based on a standard;
   passing the corresponding initial portion of the interchange format message to a file;
   receiving the subsequent set of one or more message units of the interchange format message into the allocated portion of memory such that the initial set of one or more message units is overwritten, the subsequent set of message units representing fewer than all of the plurality of message units in the message;
   transforming the received subsequent set of message units into a corresponding subsequent portion of the interchange format message based on the standard; and
   passing the corresponding subsequent portion of the interchange format to the file.

15. The method as recited in claim 14, further comprising allocating a portion of memory sufficient to receive the initial or subsequent set of message units.

16. The method as recited in claim 14, further comprising computing a digest of each of the one or more message units of the initial set, independent of each of the one or more message units of the subsequent set, and comparing the computed digest of each message unit at the receiving computer system with the corresponding digest sent by the sending computer system with the message units.

17. The method as recited in claim 14, wherein, after all of the plurality of message units of the message are received, the file is a substantial representation of the interchange format message.

18. The method as recited in claim 14, wherein the act of transforming the received initial set of message units and passing the corresponding initial portion of the interchange format message is performed by a transformation reader, wherein the transformation reader is a program class that is associated with an application.

19. A computer program product for use at a sending computer system in a computerized environment where the sending computer system and a receiving computer system can exchange one or more messages in an interchange format, the a computer program product for implementing a method of transforming an interchange format message in a resource-efficient manner, the computer program product comprising one or more computer-readable storage media having stored thereon computer-executable instructions that, when executed by a processor, cause the sending computer system to implement the method recited in claim 1.

* * * * *